United States Patent
Koga et al.

(10) Patent No.: US 10,446,843 B2
(45) Date of Patent: Oct. 15, 2019

(54) POSITIVE ELECTRODE ACTIVE MATERIAL PARTICLE POWDER FOR NON-AQUEOUS ELECTROLYTE SECONDARY BATTERY, METHOD FOR MANUFACTURING SAME, AND NON-AQUEOUS ELECTROLYTE SECONDARY BATTERY

(71) Applicant: TODA KOGYO CORP., Hiroshima (JP)

(72) Inventors: Kazumichi Koga, Yamaguchi (JP); Hiroaki Masukuni, Yamaguchi (JP); Kazutoshi Matsumoto, Chiba (JP)

(73) Assignee: TODA KOGYO CORP., Hiroshima (JP)

( * ) Notice: Subject to any disclaimer, the term of this patent is extended or adjusted under 35 U.S.C. 154(b) by 237 days.

(21) Appl. No.: 15/527,426

(22) PCT Filed: Nov. 20, 2015

(86) PCT No.: PCT/JP2015/082694
§ 371 (c)(1),
(2) Date: May 17, 2017

(87) PCT Pub. No.: WO2016/080518
PCT Pub. Date: May 26, 2016

(65) Prior Publication Data
US 2017/0331106 A1    Nov. 16, 2017

(30) Foreign Application Priority Data
Nov. 20, 2014 (JP) .................................. 2014-235886

(51) Int. Cl.
*H01M 4/505* (2010.01)
*H01M 10/0525* (2010.01)
(Continued)

(52) U.S. Cl.
CPC ........ *H01M 4/505* (2013.01); *C01G 45/1242* (2013.01); *H01M 4/131* (2013.01);
(Continued)

(58) Field of Classification Search
CPC .. H01M 4/505; H01M 10/0525; H01M 4/131; C01G 45/1214; C01G 41/00
See application file for complete search history.

(56) References Cited

U.S. PATENT DOCUMENTS

2002/0009645 A1   1/2002   Shima et al.
2002/0106566 A1   8/2002   Nemoto et al.
(Continued)

FOREIGN PATENT DOCUMENTS

EP   2381515 A1      10/2011
JP   2000-30707 A    1/2000
(Continued)

OTHER PUBLICATIONS

Park, et al. "Mo6+–Doped Li[Ni(0.5+.r)Mn(1.5–2x)Mox]O4 Spinel Materials for 5V Lithium Secondary Batteries Prepared by Ultrasonic Spray Pyrolysis," Electrochemical and Solid-State Letters, (2004) 7(11):A451-A454.
(Continued)

*Primary Examiner* — Stewart A Fraser
(74) *Attorney, Agent, or Firm* — Greenblum & Bernstein, P.L.C.

(57) ABSTRACT

Positive electrode active material particle powder includes: lithium manganese oxide particle powder having Li and Mn as main components and a cubic spinel structure with an Fd-3m space group. The lithium manganese oxide particle powder is composed of secondary particles, which are aggregates of primary particles, an average particle diameter (D50) of the secondary particles being from 4 μm to 20 μm, and at least 80% of the primary particles exposed on surfaces
(Continued)

of the secondary particles each have a polyhedral shape having at least one (110) plane that is adjacent to two (111) planes.

3 Claims, 8 Drawing Sheets

(51) Int. Cl.
  *C01G 45/12* (2006.01)
  *H01M 4/131* (2010.01)
  *C01G 41/00* (2006.01)
(52) U.S. Cl.
  CPC ........ *H01M 10/0525* (2013.01); *C01G 41/00* (2013.01); *C01G 45/1214* (2013.01); *C01P 2002/32* (2013.01); *C01P 2002/50* (2013.01); *C01P 2002/54* (2013.01); *C01P 2002/72* (2013.01); *C01P 2002/76* (2013.01); *C01P 2004/03* (2013.01); *C01P 2004/41* (2013.01); *C01P 2004/45* (2013.01); *C01P 2004/61* (2013.01); *C01P 2006/12* (2013.01)

(56) References Cited

U.S. PATENT DOCUMENTS

| | | | |
|---|---|---|---|
| 2009/0104530 A1 | 4/2009 | Shizuka et al. | |
| 2010/0207059 A1 | 8/2010 | Uegami et al. | |
| 2010/0327221 A1 | 12/2010 | Koga et al. | |
| 2011/0003205 A1 | 1/2011 | Yura et al. | |
| 2011/0297876 A1* | 12/2011 | Masukuni | C01G 45/1242 252/182.1 |
| 2014/0034872 A1* | 2/2014 | Watanabe | C01G 45/1242 252/182.1 |
| 2014/0027255 A1 | 9/2014 | Roelofs et al. | |
| 2014/0272555 A1 | 9/2014 | Roelofs et al. | |
| 2018/0183039 A1* | 6/2018 | Koga | H01M 4/505 |

FOREIGN PATENT DOCUMENTS

| | | |
|---|---|---|
| JP | 2001-52703 A | 2/2001 |
| JP | 3375898 B2 | 2/2003 |
| JP | 4114314 B2 | 7/2008 |
| JP | 2008-305777 A | 12/2008 |
| JP | 2009-176732 A | 8/2009 |
| JP | 2010-192428 A | 9/2010 |
| JP | 2010-212261 A | 9/2010 |
| JP | 5344111 B2 | 11/2013 |

OTHER PUBLICATIONS

Kang, et al. "Structural and electrochemical study of Li—Al—Mn—O—F spinel material for lithium secondary batteries," Journal of Power Sources, (2005) 146: 237-240.

Li Zhang, et al. "Carbon combustion synthesis of LiNi05Mn1.5O4 and its use as a cathode material for lithium ion batteries," Journal of Alloys and Compounds, (2009) 480:802-805.

Extended European Search Reports dated Jun. 18, 2018 for corresponding European Application No. 15860120.3.

International Search Report issued with respect to Application No. PCT/JP2015/082694, dated Feb. 23, 2016.

International Preliminary Report on Patentability issued with respect to Application No. PCT/JP2015/082694, dated May 23, 2017.

* cited by examiner

POSITIVE ELECTRODE ACTIVE MATERIAL PARTICLE POWDER FOR NON-AQUEOUS ELECTROLYTE SECONDARY BATTERY, METHOD FOR MANUFACTURING SAME, AND NON-AQUEOUS ELECTROLYTE SECONDARY BATTERY

TECHNICAL FIELD

The present invention relates to positive electrode active material particle powder for non-aqueous electrolyte secondary batteries, methods for manufacturing same, and non-aqueous electrolyte secondary batteries.

BACKGROUND ART

With the spread of mobile devices in recent years, secondary batteries are being widely used. Among them, lithium ion secondary batteries, which are characterized by high charging/discharging voltage and large charging/discharging capacity, have attracted attention.

Conventionally, as positive electrode active material in a 4 V class high energy lithium ion secondary battery, spinel type structure $LiMn_2O_4$, layered rock salt type structure $LiCoO_2$, $LiCo_{1-x}Ni_xO_2$, $LiNiO_2$, and the like are generally known. Among these, $LiCoO_2$ excels in that it has a high voltage and high capacity, but the supply amount of cobalt material is small, leading to increased manufacturing cost, and there is also a problem from the viewpoint of environmental safety of waste batteries after use.

On the other hand, research into spinel structure lithium manganese oxide (basic composition: $LiMn_2O_4$) is thriving, because a large supply amount can suppress increases in cost, and manganese having good environmental suitability is used. Further, in a layered rock salt type structure of positive electrode active material, diffusion paths of Li are two-dimensional, whereas in a spinel structure of positive electrode active material, diffusion paths of Li are three-dimensional, which is of interest in positive electrode active material for secondary batteries, particularly for vehicular applications and stationary applications.

Here, when high crystallinity is developed in order to obtain high battery performance, obtained lithium manganese oxide particles have an octahedral structure that is the idiomorphic shape of a cubic spinel structure, and dissolution of Mn is likely to occur. Further, in a secondary battery using such a positive electrode active material, problems occur such as inferior storage properties at high temperatures.

Varied research and development (Patent Literature 1-4) has been undertaken to solve the problems of non-aqueous electrolyte secondary batteries using such lithium manganese oxide spinel structure positive electrode active material.

CITATION LIST

Patent Literature

[Patent Literature 1] Japanese patent 4114314
[Patent Literature 2] Japanese patent 3375898
[Patent Literature 3] Japanese patent 5344111
[Patent Literature 4] Japanese patent 5435278

SUMMARY OF INVENTION

Technical Problem

However, conventional technology, including the technology proposed in Patent Literature 1 to 4, cannot be said to be sufficient for constituting a non-aqueous electrolyte secondary battery that excels in rate properties.

The present invention has been achieved in view of such problems, and an aim thereof is to provide a positive electrode active material particle powder for a non-aqueous electrolyte secondary battery, a method for manufacturing same, and a non-aqueous electrolyte secondary battery, which excel in rate properties.

Solution to Problem

Positive electrode active material particle powder for a non-aqueous electrolyte secondary battery pertaining to one aspect of the present invention is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape having at least one (110) plane that is adjacent to two (111) planes.

Advantageous Effects of Invention

The positive electrode active material particle powder for a non-aqueous electrolyte secondary battery pertaining to the above aspect excels in rate properties. Therefore, the positive electrode active material particle powder is applicable as a positive electrode active material of a non-aqueous electrolyte secondary battery that excels in rate properties.

DESCRIPTION OF THE INVENTION

[Developments Leading to Present Invention]

Figure 1A:
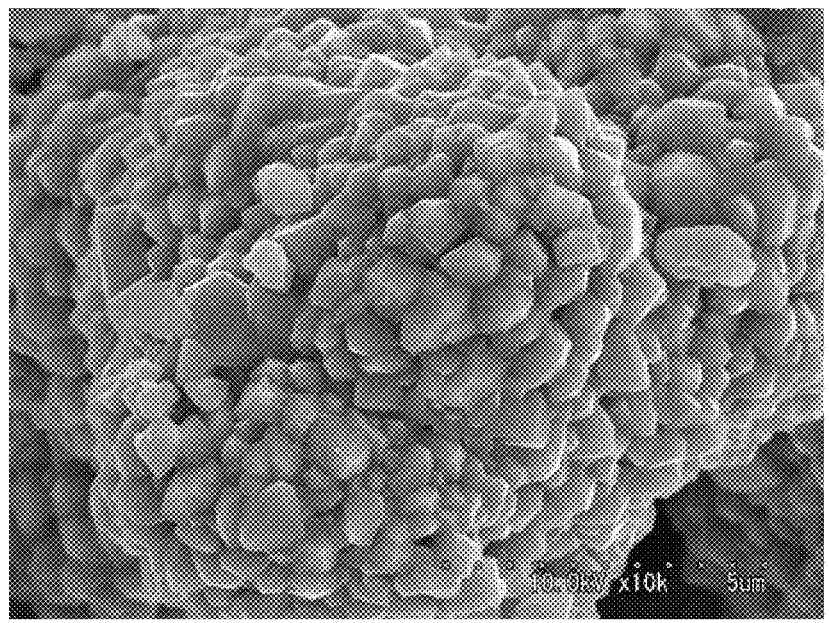
FIG. 1A is a scanning electron microscope (SEM) image showing outer appearance of aggregated secondary particles pertaining to example 1.

In the course of arriving at the present invention, the inventors conducted the following investigation.

(1) Crystal Planes and Improving Rate Properties

The inventors considered that desorption/insertion of Li is performed smoothly for improvement in rate properties, and therefore that it is important to stabilize the crystal lattice and cause Li diffusion from a specific crystal plane. Generally, it is considered that elements such as Li and Mn are concentrated in (111) planes of crystals, and this inhibits entry and exit of Li.

Thus, the inventors found that (110) planes that allow smooth exit and entry of Li can be made to appear more frequently among crystal planes of primary particles, and that decreasing surface area of (111) planes is important.

(2) Measure to Make (110) Planes Appear More, and (111) Planes Appear Less

The reason a cubic manganese spinel crystal is likely to form the idiomorphic octahedral shape composed of (111) planes and planes equivalent thereto is considered to be because the crystal plane growth rate of planes equivalent to (111) planes is lower than that of other crystal planes (for example, (100) planes, (110) planes, (221) planes, and planes equivalent thereto). Therefore, it is considered that an octahedral shape of crystal composed of (111) planes and planes equivalent thereto is likely to form in order to minimize crystal plane growth rate of an entire crystal.

Accordingly, it was found that a means to lower crystal plane growth rate of planes other than (111) planes, in particular (110) planes, i.e., suppressing growth of crystal planes, can obtain a crystal having these planes.

Note that in this description and claims, the term "(111) plane" includes any planes equivalent to a (111) plane. That is, eight planes including a (−111) plane, a (1-11) plane, and a (11-1) plane. Further, the term "(110) plane" includes any planes equivalent to a (110) plane. That is, twelve planes including a (101) plane, a (011) plane, and a (−110) plane. In the following description, unless otherwise specified, the terms "(111) planes" and "(110) planes" have the meaning "including equivalent planes" as described above.

In description of crystal planes, "−1" is supposed to be written so the "−" is a bar above the "1", but in the present description, "−1" is written for convenience.

[Aspects of the Present Invention]

The positive electrode active material particle powder for a non-aqueous electrolyte secondary battery pertaining to one aspect of the present invention is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μM, and at least 80% of the primary particles exposed on surfaces of the secondary particles each have a polyhedral shape having at least one (110) plane that is adjacent to two (111) planes.

According to the above aspect, "a polyhedral shape having at least one (110) plane that is adjacent to two (111) plane" indicates a polyhedral shape in which ridges are formed by flat crystal planes abutting each other. Here, "ridges" may overlap in a way that crystal planes are known.

Positive electrode active material particle powder for a non-aqueous electrolyte secondary battery pertaining to another example is configured so that one or more metal elements other than Mn are substituted at an Mn(16d) site, and when Me denotes a metal element other than Li among the one or more metal elements, an [Li/(Mn+Me)] ratio is from 0.5 to 0.65.

Further, a non-aqueous electrolyte secondary battery pertaining to another aspect of the present invention comprises: a positive electrode element that includes the positive electrode active material particle powder pertaining to any one of the examples described above.

Further, a method of manufacturing positive electrode active material particle powder for a non-aqueous electrolyte secondary battery pertaining to another aspect of the present invention is a method comprising: mixing trimanganese tetroxide, a lithium compound, and a crystal plane growth suppressor to form a mixture, and firing the mixture in an oxidizing atmosphere at a temperature from 700° C. to 950° C.

The method of manufacturing positive electrode active material particle powder for a non-aqueous electrolyte secondary battery pertaining to another example is configured so that the trimanganese tetroxide is composed of secondary particles, which are aggregates of primary particles, an average particle diameter (D50) of the secondary particles being from 3 μm to 20 μm, and crystallite size of the primary particles being from 50 nm to 150 nm.

Further, the method of manufacturing positive electrode active material particle powder for a non-aqueous electrolyte secondary battery pertaining to another example is configured so that the crystal plane growth suppressor is at least a tungsten compound. Note that metal compounds other than a tungsten compound may be included as the crystal plane growth suppressor.

Hereinafter, examples for implementing the present invention are described with reference to the drawings.

Note that the following configuration is an example used for describing structures of the present invention and actions and effects exerted by the configuration in an easy-to-understand manner, and aside from essential elements thereof, the present invention is not limited to the example described below.

EMBODIMENT

1. Outline of Structure of Positive Electrode Active Material Particle Powder

An outline of structure of positive electrode active material particle powder pertaining to the present embodiment is described below.

The positive electrode active material particle powder pertaining to the present embodiment is primarily composed of lithium (Li) and manganese (Mn), and is lithium manganese oxide having a cubic spinel structure of space group Fd-3m (stoichiometric composition: $LiMn_2O_4$). However, the positive electrode active material particle powder pertaining to the present embodiment is not limited to the stoichiometric composition above, and as long as the crystal structure is maintained, cations are deficient or excessive, or it is also possible to have a composition in which oxygen ions are deficient or excessive.

In the positive electrode active material particle powder pertaining to the present embodiment, a part of Mn may be partially substituted with cations of another metal element (for example, one or more metal elements selected from metal elements that can be substituted at the 16d site such as Li, Fe, Ni, Mg, Zn, Al, Co, Cr, Si, Ti, Sn, V, or Sb).

2. Crystal Plane Growth Suppression

The positive electrode active material particle powder pertaining to the present embodiment is formed into a desired shape by using a tungsten (W) compound as a crystal plane growth suppressor. Content of W in the positive electrode active material particle powder, in terms of molar ratio of metal substitute to Mn, is preferably in a range from 0.0007 to 0.006, and more preferably in a range from 0.0008 to 0.005.

3. Ratio of Li/(Mn+Me)

In the positive electrode active material particle powder pertaining to the present embodiment, a ratio of Li/(Mn+Me) is preferably 0.5 or greater. This is because internal resistance can be reduced and crystal structure strengthened when compared to a stoichiometric composition of $LiMn_2O_4$, to further improve properties as a positive electrode active material of a non-aqueous electrolyte secondary battery with excellent rate properties.

For example, $Li(Li_xMn_{2-x})O_4$ (where x is a substitution amount) in which a part of Mn is substituted with Li, $Li(Li_xAl_yMn_{2-x-y})O_4$ (where x and y are substitution amounts) in which a part of Mn is substituted with Al and Li, and the like can be used. Note that a desired Li/(Mn+Me) ratio is from 0.50 to 0.65, and more preferably from 0.53 to 0.63.

4. Crystal Planes

Figure 2A:
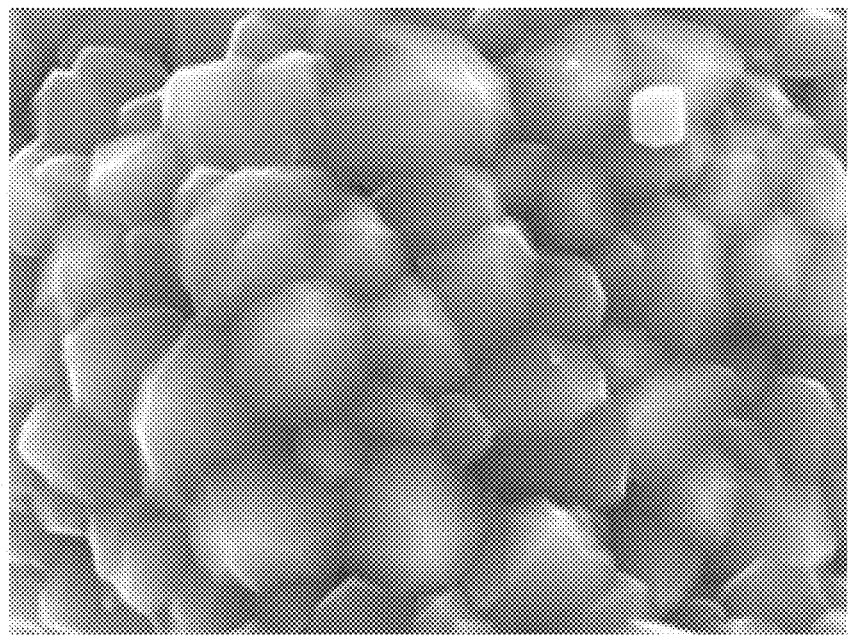
FIG. 2A is an enlargement of a portion of an SEM image of an outer appearance of aggregated secondary particles pertaining to example 1 and FIG. 2B schematically shows structure of a primary particle.
Figure 2B:
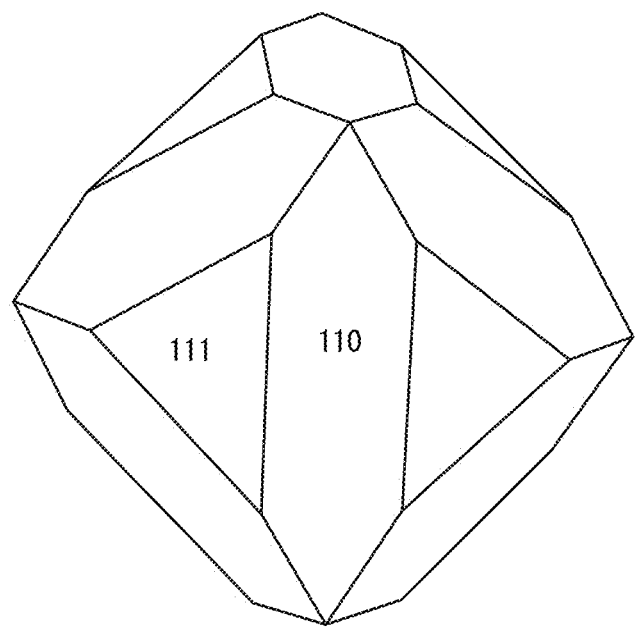

Primary particles of the positive electrode active material particle powder pertaining to the present embodiment have shapes as shown in FIG. 1A and FIG. 2A. That is, as shown in FIG. 2B, a shape of primary particles of the positive electrode active material particle powder pertaining to the present embodiment is a polyhedral shape having at least one (110) plane that is adjacent to two (111) planes.

Note that according to the positive electrode active material particle powder pertaining to the present embodiment, an octahedron, which is the idiomorphic form of a cubic spinel structure, and shapes close thereto, are not shown. Octahedral particles, which are the idiomorphic form of lithium manganese oxide, become composed of (111) planes as a result of crystal growth rate of (111) being slower than the growth rate of other crystal planes. Therefore, by using a method of suppressing crystal growth other than in (111) planes as a method of controlling particle shape, it is possible for crystal planes to remain that would normally disappear in the course of crystal growth.

Figure 1B:
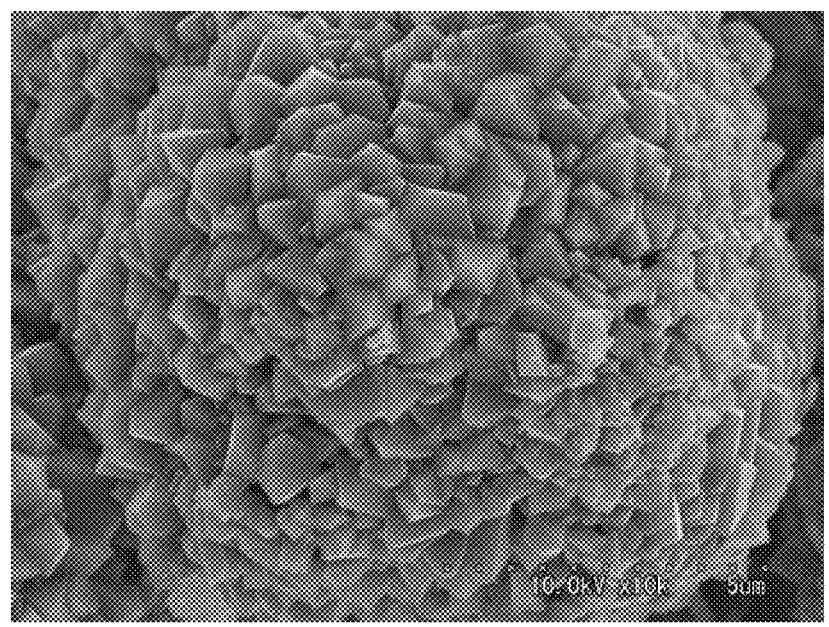
FIG. 1B is an SEM image showing outer appearance of aggregated secondary particles pertaining to comparative example 1.
Figure 3A:
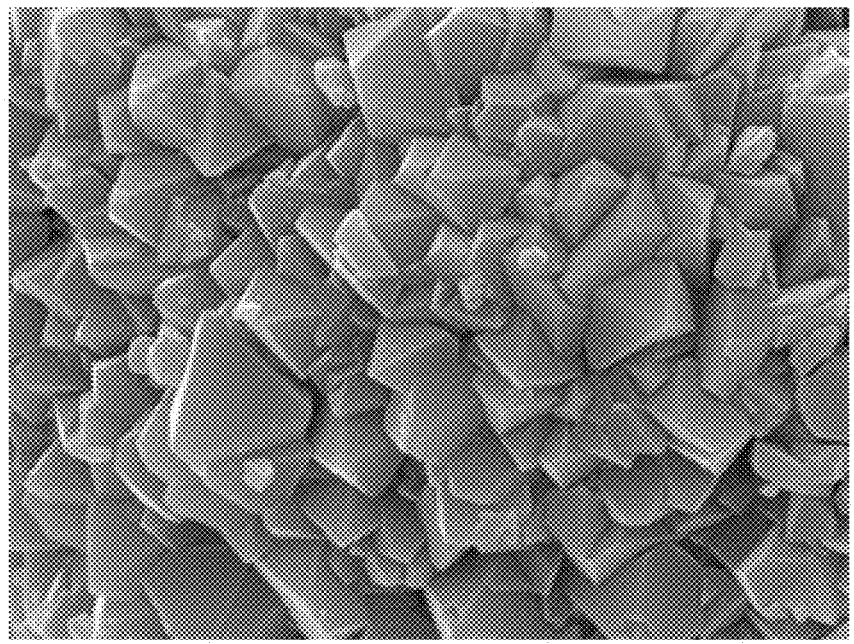
FIG. 3A is an enlargement of a portion of an SEM image of an outer appearance of aggregated secondary particles pertaining to comparative example 1 and FIG. 3B schematically shows structure of a primary particle.
Figure 3B:
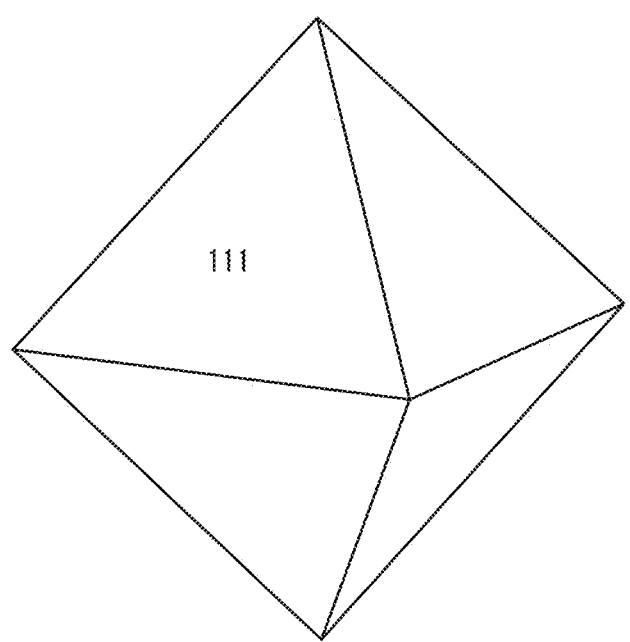
Figure 4:
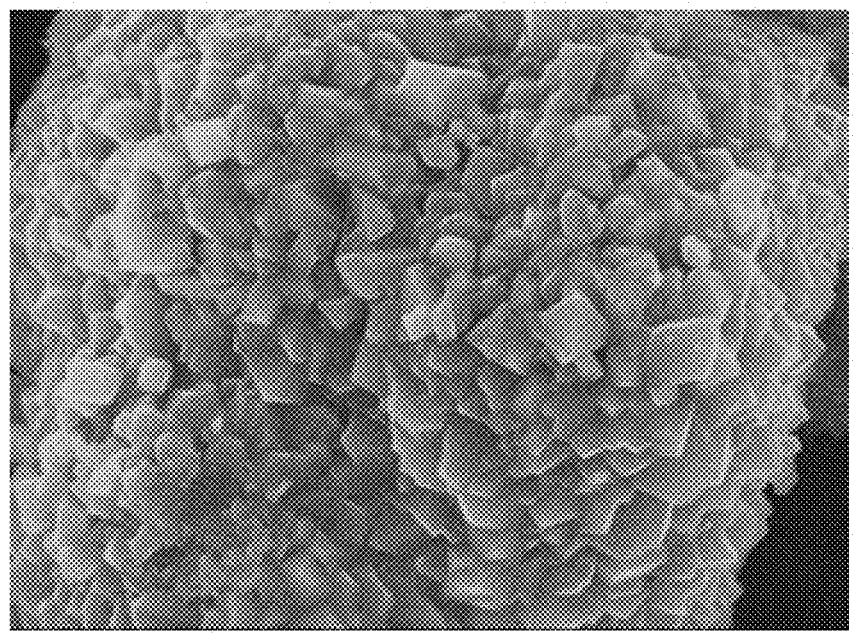
FIG. 4 is an SEM image of an outer appearance of aggregated secondary particles pertaining to comparative example 2.

On the other hand, as shown by comparative example 1 in FIG. 1B and FIG. 3A, and comparative example 2 in FIG. 4, octahedral particles that are the idiomorphic shape of lithium manganese oxide become composed of (111) planes as a result of growth rate of (111) planes being slower than that of other crystal planes (FIG. 3B).

Note that, as long as rate properties as a non-aqueous electrolyte secondary battery are excellent, primary particles that cross each other, share a crystal plane, or in which a portion of a surface of a primary particle grows from another primary particle, or even in which a part of the shape is missing may be included in the positive electrode active material particle powder pertaining to the present embodiment.

It suffices that, for at least 75%, preferably 80% of primary particles visible on surfaces of aggregated secondary particle such as that shown in FIG. 1A, the primary particles have a polyhedral shape having at least one (110) plane adjacent to two (111) planes, as shown in FIG. 2B.

5. Primary Particle Diameter and Secondary Particle (Aggregate) Diameter

Average primary particle diameter of positive electrode active material particle powder pertaining to the present embodiment is from 0.3 µm to 5 µm, preferably from 0.4 µm to 4 µm, and more preferably from 0.5 µm to 3 µm.

Average secondary particle diameter (D50) is from 4 µm to 20 µm. Excellent high temperature performance as a secondary battery can be obtained by controlling average secondary particle diameter to the above range.

According to the present embodiment, average primary particle diameter was observed using a scanning electron microscope with energy dispersive X-ray analyzer (SEM-EDX) (manufactured by Hitachi High-Technologies Corporation) and an average value read from an SEM image.

Further, average secondary particle diameter (D50) is a volume-based average particle diameter measured by a wet laser method using a laser particle size distribution measuring apparatus Microtrac HRA (manufactured by Nikkiso Co., Ltd.).

6. Specific Surface Area by BET Method

Specific surface area of a positive electrode active material particle powder pertaining to the embodiment according to the BET method is from 0.1 $m^2/g$ to 1.2 $m^2/g$. When specific surface area according to the BET method is less than 0.1 $m^2/g$, growth of primary particles proceeds excessively, which is considered to lead to a decrease in stability. On the other hand, when specific surface area according to the BET method exceeds 1.2 $m^2/g$ and primary particles that are too small (primary particle diameter is smaller than desired) become an aggregated secondary particle body, the aggregated secondary particle is unable to maintain a framework, and properties as a positive electrode active material become unstable.

Specific surface area according to the BET method is preferably from 0.15 $m^2/g$ to 0.8 $m^2/g$, and more preferably from 0.2 $m^2/g$ to 0.75 $m^2/g$.

7. Other Properties

A lattice constant of the positive electrode active material particle powder pertaining to the present embodiment is from 0.8185 nm to 0.8225 nm.

Figure 5:
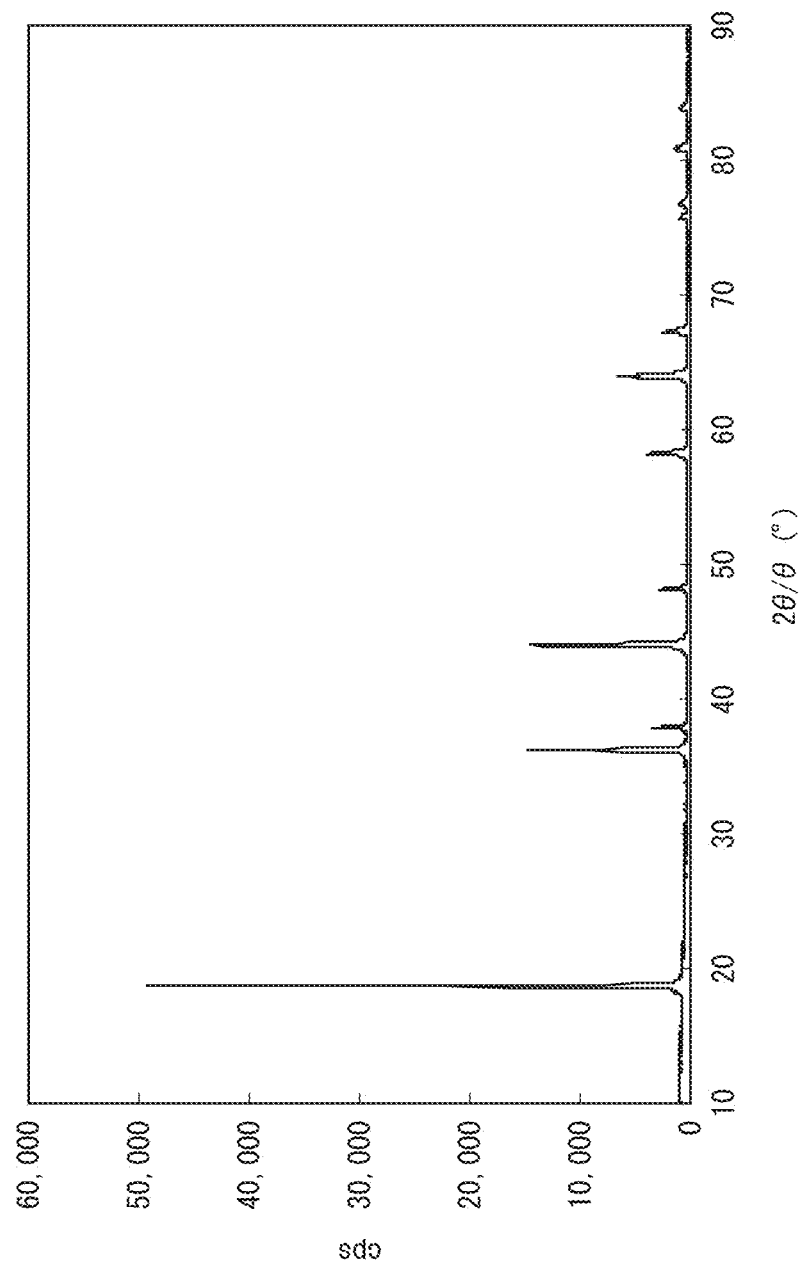
FIG. 5 shows an X-ray diffraction (XRD) of aggregated secondary particles pertaining to example 1.

Further, as shown in FIG. 5, in X-ray diffraction (XRD) of the positive electrode active material particle powder pertaining to the present embodiment, aside from lithium manganese oxide that can be indexed by Fd-3m no other phases are observed. Therefore, it is considered that tungsten (W) is substituted with the lattice of lithium manganese oxide particles. Further, a result of observing the SEM image is aggregate particles that have polyhedral shapes having at least one (110) plane that is adjacent to two (111) planes, as shown in FIG. 1A and FIG. 2A.

For X-ray diffraction, measurement was carried out using SmartLab (manufactured by Rigaku Corporation) (source: CuKα), and measurement conditions were 10° to 90° in 2θ/θ by 0.02° steps (1.2 s hold scan) at 0.02° increments. Further, when obtaining lattice constant information, a standard powder of Si was used as an internal standard substance and calculation performed by using the Rietveld method.

8. Method of Manufacturing Positive Electrode Active Material Particle Powder

A method of manufacturing positive electrode active material particle powder pertaining to the present embodiment is described below, with reference to FIG. 6.

(i) First, a lithium compound, trimanganese tetroxide, and a crystal plane growth suppressor are mixed in a ball mill (step S1).

Figure 6:
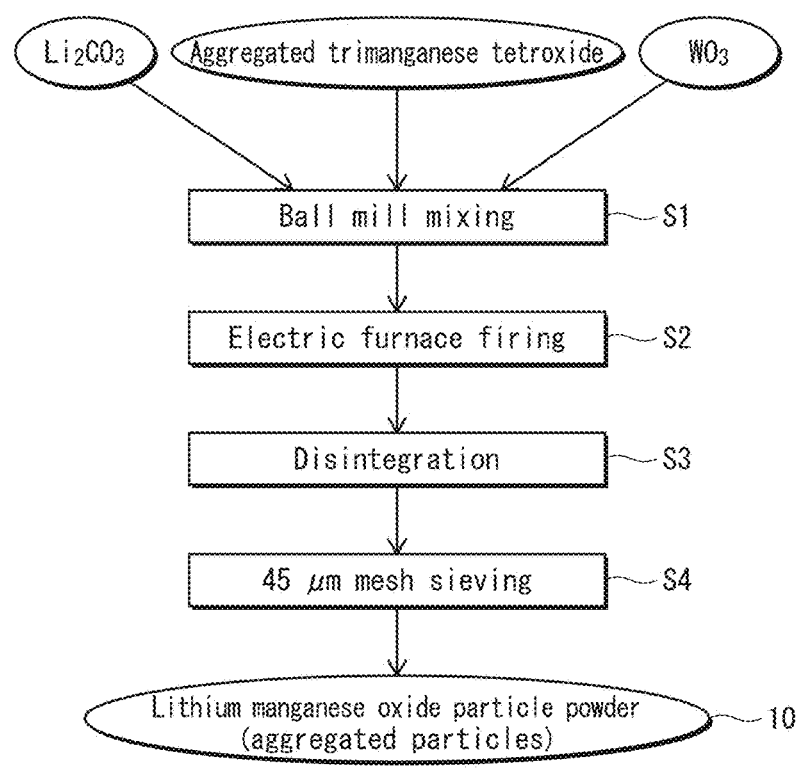
FIG. 6 schematically shows a method for manufacturing agglomerated secondary particles pertaining to an embodiment.

As shown in FIG. 6, according to the present embodiment, $Li_2CO_3$ is used as an example of a lithium compound.

Further, aggregated trimanganese tetroxide ($Mn_3O_4$) formed by aggregation of fine primary particles is used as trimanganese tetroxide as a manganese compound. The trimanganese tetroxide ($Mn_3O_4$) has a primary particle diameter according to crystallite size from 50 nm to 150 nm, preferably from 60 nm to 140 nm, and preferably an average secondary particle diameter from 3 μm to 20 μm. This is because the primary particle diameter being too large or too small is considered to lead to deterioration of properties of lithium oxide, and the average secondary particle diameter being too small is considered to lead to deterioration of properties of lithium oxide. Further, when average secondary particle diameter is too large, reaction when combined with Li deteriorates, and as a result, it is considered to lead to instability in a crystal of lithium manganese oxide.

Note that crystallite size of trimanganese tetroxide was calculated by using the Rietveld method from powder X-ray diffraction. For X-ray diffraction, measurement was carried out using SmartLab (manufactured by Rigaku Corporation) (source: CuKα), and measurement conditions were 10° to 90° in 2θ/θ by 0.02° steps (1.2 s hold scan) at 0.02° increments.

According to the present embodiment, as an example of the crystal plane growth suppressor, $WO_3$ is used, which is a tungsten compound. However, it is also possible to use a tungsten compound other than $WO_3$, or to use an element other than a tungsten compound to function as a crystal plane growth suppressor.

Here, the added amount of the tungsten compound as the crystal plane growth suppressor is from 0.07 mol % to 0.6 mol % in terms of W substitute with respect to Mn. When the added amount of tungsten compound is less than the above range, a function as the crystal plane growth suppressor is considered to be insufficient, and conversely, when the added amount is greater than the above range, it is considered that excess tungsten substitutes into positive electrode active material particles, inhibit function of the battery using the positive electrode active material, become a resistance component, and lead to deterioration in rate properties. The added amount of tungsten compound in terms of W substitute with respect to Mn is preferably from 0.09 mol % to 0.6 mol %, and more preferably from 0.1 mol % to 0.5 mol %.

(ii) Next, the mixture formed by mixing is fired in an oxidizing atmosphere (step S2). Firing temperature is from 700° C. to 950° C., and more preferably from 730° C. to 900° C.

(iii) Next, positive electrode active material particle powder obtained by firing is disintegrated (step S3), and passed through a sieve of a mesh with mesh openings of 45 μm (step S4), in order to obtain positive electrode active material particle powder 10 pertaining to the present embodiment.

In manufacturing the positive electrode active material particle powder, it is also possible to mix substituted metal element compound together with the lithium compound, trimanganese tetroxide, and crystal plane growth suppressor. In this case, as the substituted metal element, at least one metal element other than Mn, able to substitute at the Mn(16d) site can be used. By using such a substituted metal element, it is possible to control charge/discharge capacity of a battery, and to improve rate properties and high temperature properties. As specific examples, Li, Fe, Ni, Mg, Zn, Al, Co, Cr, Si, Ti, Sn, V, Sb, and the like can be used as a substituted metal element.

Further, it is preferable that a substituted metal element is uniformly present inside the positive electrode active material particles (a uniform solid solution). In a case in which a metal element is unevenly distributed inside a particle, it is considered to deteriorate stability in a non-aqueous electrolyte secondary battery.

9. Non-Aqueous Electrolyte Secondary Battery

Configuration of a lithium ion secondary battery 100 according to the present embodiment, which is manufactured using the positive electrode active material particle powder described above, is described with reference to FIG. 7.

The lithium ion secondary battery 100 pertaining to the present embodiment includes a tablet-like positive electrode element 1 and a negative electrode element 2 disposed so as to sandwich a separator 3, and is stored inside a package body composed of a positive electrode case 4 and a negative electrode case 5. The positive electrode case 4 is electrically connected to the positive electrode element 1, and the negative electrode case 5 is electrically connected to the negative electrode element 2. The positive electrode case 4 and the negative electrode case 5, in a state in which a gasket 6 is closely sandwiched therebetween, are caulked by outer edge portions 4e, 5e.

(i) Positive Electrode Element 1

The positive electrode element 1 is formed by using the positive electrode active material particle powder 10. A specific method of forming the positive electrode element 1 is omitted because it is possible to adopt a publicly-known method, but the positive electrode element 1 can be formed by adding and mixing a conductive agent and a binder to the positive electrode active material particle powder 10.

As the conductive agent, acetylene black, carbon black, graphite, and the like can be used, for example. Further, as the binder, polytetrafluoroethylene, polyvinylidene fluoride, and the like can be used.

(ii) Negative Electrode Element 2

The negative electrode element 2 is formed by using a negative electrode active material such as lithium metal, lithium/aluminium alloy, lithium/tin alloy, or graphite. In the lithium ion secondary battery 100 pertaining to the present embodiment, as one example, Li foil having a thickness of 300 μm is used.

(iii) Electrolytic Solution

As a solvent of the electrolytic solution, an organic solvent can be used that contains at least one of a combination of ethylene carbonate and diethyl carbonate, a carbonate such as propylene carbonate or dimethyl carbonate, and an ether such as dimethoxyethane.

As an electrolyte of the electrolytic solution, at least one of lithium hexafluorophosphate or a lithium salt such as lithium perchlorate or lithium tetrafluoroborate can be used, and this electrolyte is dissolved in the solvent.

According to the lithium ion secondary battery 100 pertaining to the present embodiment, as one example, 1 mol/L of $LiPF_6$ added to non-aqueous electrolyte solution (EC: DMC=1:2 ratio) is used.

Figure 7:
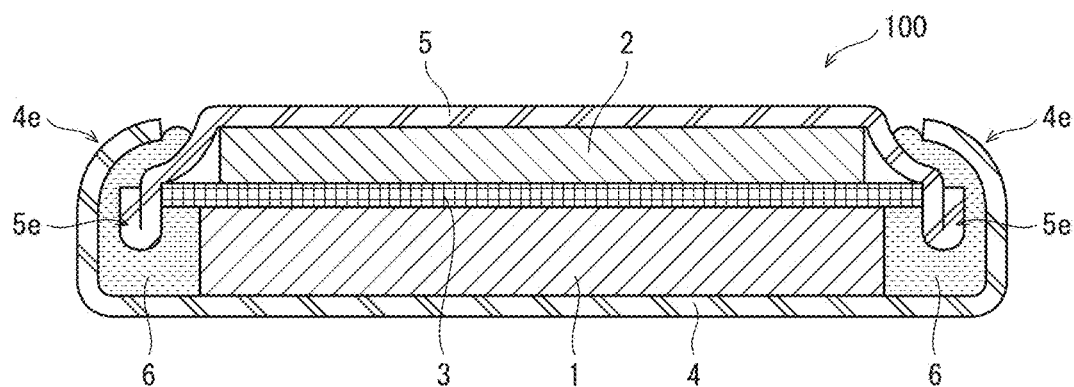
FIG. 7 is a schematic cross section showing configuration of a non-aqueous electrolyte secondary battery 100 pertaining to an embodiment.

As shown in FIG. 7, the lithium ion secondary battery 100 pertaining to the present embodiment is, for example, a 2032 size coin cell. An initial discharge capacity of the lithium ion secondary battery 100 is from 80 mAh/g to 120 mAh/g. In a case of an initial discharge capacity less than 80 mAh/g, battery capacity is too low for practical use. Further, in a case of an initial discharge capacity greater than 120 mAh/g, sufficient stability cannot be ensured for battery properties. Initial discharge capacity of the lithium ion secondary battery 100 is preferably from 85 mAh/g to 115 mAh/g.

Further, according to the lithium ion secondary battery 100 pertaining to the present embodiment, a rate property of at least 95% is preferable, and at least 96% is more preferable.

Further, according to the lithium ion secondary battery 100 pertaining to the present embodiment, a capacity recovery rate of at least 96% is preferable, and at least 96.3% is more preferable.

10. Effects

According to the lithium ion secondary battery 100 using the positive electrode active material particle powder 10 pertaining to the present embodiment, it is possible to improve rate properties.

In the method for manufacturing the positive electrode active material particle powder, when the manganese compound, the lithium compound, and crystal plane growth suppressor are homogeneously mixed and fired at a temperature from 700° C. to 950° C. in an oxidizing atmosphere (for example, in air), and resulting particle powder is used in a non-aqueous electrolyte secondary battery, it is possible to obtain the positive electrode active material particle powder 10 capable of improving rate properties.

[Evaluation]

The following describes property evaluation results using specific working examples.

First, examples and comparative examples used for evaluation are described with reference to Table 1.

to this example, as shown in FIG. 1A and FIG. 2A, focusing on the primary particles, it was confirmed that aggregated particles were composed of primary particles forming polyhedral shapes having one or more (110) planes that are adjacent to two (111) planes.

Further, the resultant positive electrode active material particle powder had an average primary particle diameter of approximately 0.8 μm and an average secondary particle diameter (D50) of 14.2 μm.

Next, using the positive electrode active material particle powder manufactured as described above, a lithium ion secondary battery was manufactured as follows.

By weight, 92% the positive electrode active material particle powder, 2.5% acetylene black and 2.5% graphite as a conductive agent, and 3% polyvinylidene fluoride dissolved in N-methylpyrrolidone as a binder were mixed, coated on Al metal foil and dried at 120° C. A sheet prepared in this way was punched out to a 14 mm diameter, then pressed at 1.5 ton/cm$^2$ for use as a positive electrode element.

Metal lithium having a thickness of 300 μm was punched out to a 16 mm diameter for use as a negative electrode element.

As an electrolytic solution, a solution prepared by mixing 1 mol/L LiPF$_6$ in EC and DMC at a volume ratio of 1:2 was used.

TABLE 1

| | Precursor | | | Mixed composition | | | Firing conditions | |
|---|---|---|---|---|---|---|---|---|
| | | Average secondary particle diameter (μm) | Crystallite size (nm) | Li/(Mn + Me) | Substituted metal element Me | Crystal plane growth suppressor | Crystal plane growth suppressor added amount (mol %) | Air temperature (° C.) | Time (hours) |
| | Mn compound | | | | | | | | |
| Example 1 | Mn$_3$O$_4$ | 10.5 | 92 | 0.58 | — | WO$_3$ | 0.30 | 820 | 3 |
| Example 2 | Mn$_3$O$_4$ | 10.5 | 92 | 0.58 | — | WO$_3$ | 0.10 | 820 | 3 |
| Example 3 | Mn$_3$O$_4$ | 10.5 | 92 | 0.57 | Al(OH)$_3$ | WO$_3$ | 0.30 | 830 | 3 |
| Example 4 | Mn$_3$O$_4$ | 10.5 | 92 | 0.55 | MgO | WO$_3$ | 0.30 | 830 | 3 |
| Comparative example 1 | Mn$_3$O$_4$ | 10.5 | 92 | 0.58 | — | — | — | 820 | 3 |
| Comparative example 2 | Mn$_3$O$_4$ | 10.5 | 92 | 0.58 | — | WO$_3$ | 0.05 | 820 | 3 |
| Comparative example 2 | Mn$_3$O$_4$ | 10.5 | 92 | 0.58 | — | WO$_3$ | 0.70 | 820 | 3 |

EXAMPLE 1

The positive electrode active material particle powder pertaining to Example 1 was manufactured as follows.

As shown in Table 1, trimanganese tetroxide (Mn$_3$O$_4$) of crystallite size 92 nm and average secondary particle diameter 10.5 μm, lithium carbonate (Li$_2$CO$_3$), and tungsten oxide (WO$_3$) at 0.30 mol % of W to moles of Mn in trimanganese tetroxide as a crystal plane growth suppressor were weighed and mixed at a ratio Li/(Mn+W)=0.58; then fired in an air atmosphere at 820° C. for three hours to produce lithium manganese oxide particle powder.

As shown in FIG. 5, according to X-ray diffraction, in the resultant positive electrode active material particle powder, only lithium manganese oxide that can be indexed by Fd-3m was observed. That is, the positive electrode active material particle powder pertaining to Example 1 had a composition of Li$_{1.10}$Mn$_{1.89}$W$_{0.006}$O$_4$.

Further, as a result of SEM image observation of the positive electrode active material particle powder pertaining The lithium ion secondary battery according to this example is a 2032 type coin cell.

EXAMPLE 2

As shown in Table 1, in the positive electrode active material particle powder pertaining to Example 2, the added amount of W was changed to 0.10 mol % from the amount of Example 1. Manufacture was otherwise identical. Composition of the positive electrode active material particle powder pertaining to Example 2 is Li$_{1.10}$Mn$_{1.90}$W$_{0.002}$O$_4$.

EXAMPLE 3

The positive electrode active material particle powder pertaining to Example 3 was manufactured as follows.

As shown in Table 1, trimanganese tetroxide (Mn$_3$O$_4$) of crystallite size 92 nm and average secondary particle diameter 10.5 μM, lithium carbonate (Li$_2$CO$_3$), aluminium hydroxide (Al(OH)$_3$), and tungsten oxide (WO$_3$) at 0.30 mol % of W to moles of Mn in trimanganese tetroxide were weighed and mixed at a ratio Li/(Mn+Al+W)=0.57; then fired in an air atmosphere at 830° C. for three hours to produce lithium manganese oxide particle powder. That is, the positive electrode active material particle powder pertaining to Example 3 had a composition of $Li_{1.08}Mn_{1.84}Al_{0.07}W_{0.006}O_4$.

Other elements of the lithium ion secondary battery were the same as in Examples 1 and 2.

EXAMPLE 4

The positive electrode active material particle powder pertaining to Example 4 was manufactured as follows.

As shown in Table 1, trimanganese tetroxide ($Mn_3O_4$) of crystallite size 92 nm and average secondary particle diameter 10.5 μm, lithium carbonate ($Li_2CO_3$), magnesium oxide (MgO), and tungsten oxide ($WO_3$) at 0.30 mol % of W to moles of Mn in trimanganese tetroxide were weighed and mixed at a ratio Li/(Mn+Mg+W)=0.55; then fired in an air atmosphere at 830° C. for three hours to produce lithium manganese oxide particle powder. That is, the positive electrode active material particle powder pertaining to Example 4 had a composition of $Li_{0.07}Mn_{1.87}Mg_{0.05}W_{0.006}O_4$.

Other elements of the lithium ion secondary battery were the same as in Examples 1, 2, and 3.

COMPARATIVE EXAMPLE 1

As shown in Table 1, in manufacture of the positive electrode active material particle powder pertaining to Comparative example 1, W, which is a crystal plane growth suppressor, is not added. Composition of the positive electrode active material particle powder pertaining to Comparative example 1 is $Li_{1.10}Mn_{1.90}O_4$.

Other manufacturing conditions are the same as in Example 1.

COMPARATIVE EXAMPLE 2

As shown in Table 1, in manufacture of the positive electrode active material particle powder pertaining to Comparative Example 2, in contrast to Example 1, an amount of W is 0.05 mol % with respect to moles of Mn in trimanganese tetroxide. Other manufacturing conditions are the same as in Example 1. Composition of the positive electrode active material particle powder pertaining to Comparative Example 2 is $Li_{1.10}Mn_{1.90}W_{0.001}O_4$.

COMPARATIVE EXAMPLE 3

As shown in Table 1, in manufacture of the positive electrode active material particle powder pertaining to Comparative Example 3, in contrast to Example 1, an amount of W is 0.70 mol % with respect to moles of Mn in trimanganese tetroxide. Other manufacturing conditions are the same as in Example 1. Composition of the positive electrode active material particle powder pertaining to Comparative Example 3 is $Li_{1.10}Mn_{1.89}W_{0.014}O_4$.

Lithium ion secondary batteries manufactured as described above were evaluated as follows.

(Capacity Recovery Rate)

With respect to capacity recovery rate indicating high temperature properties, the lithium ion secondary batteries were charged to 4.3 V at a 0.1 C-rate of current density (constant current, constant voltage, (CC-CV)), then discharged to 3.0 V (constant current (CC)). Let the discharge capacity at that time be "a".

Subsequently, the lithium ion secondary batteries were charged again to 4.3 V at a 0.1 C-rate of current density (CC-CV), removed from a charge/discharge device, and left for six weeks in a constant temperature bath at 60° C. After six weeks the lithium ion secondary batteries were removed from the constant temperature bath, attached to a charge/discharge device, discharged at a 0.1 C-rate (CC) to 3.0 V, charged to 4.3 V (CC-CV), and discharged to 3.0 V (CC). Let the discharge capacity at that time be "b".

Then, (b/a×100) was taken as the capacity recovery rate (%). Results are shown in Table 2.

TABLE 2

| | | Battery properties | | |
|---|---|---|---|---|
| | Positive electrode active material composition | Initial discharge capacity (mAh/g) | Capacity recovery rate (%) | Rate property (%) |
| Example 1 | $Li_{1.10}Mn_{1.89}W_{0.006}O_4$ | 105.9 | 96.9 | 97.1 |
| Example 2 | $Li_{1.10}Mn_{1.90}W_{0.002}O_4$ | 105.1 | 96.6 | 96.3 |
| Example 3 | $Li_{1.08}Mn_{1.84}Al_{0.07}W_{0.006}O_4$ | 104.8 | 97.3 | 96.2 |
| Example 4 | $Li_{1.07}Mn_{1.87}Mg_{0.05}W_{0.006}O_4$ | 105.1 | 97.2 | 96.1 |
| Comparative example 1 | $Li_{1.10}Mn_{1.90}O_4$ | 104.7 | 94.9 | 94.1 |
| Comparative example 2 | $Li_{1.10}Mn_{1.90}W_{0.001}O_4$ | 105.8 | 96.4 | 94.1 |
| Comparative example 3 | $Li_{1.10}Mn_{1.89}W_{0.014}O_4$ | 105.8 | 95.3 | 93.2 |

(Rate property)

For rate properties, between 3.0 V and 4.3 V in a 25° C. environment, charging was performed at a C-rate of 0.1 (CC-CV) and when discharging at a C-rate of 0.1 or 10 (CC), discharge capacity at the C-rate of 0.1 is defined as "c" and discharge capacity at the C-rate of 10 is defined as "d".

Then (d/c×100) was taken as the rate property (%). These results are also shown in Table 2.

(Discussion 1)

Figure 8A:
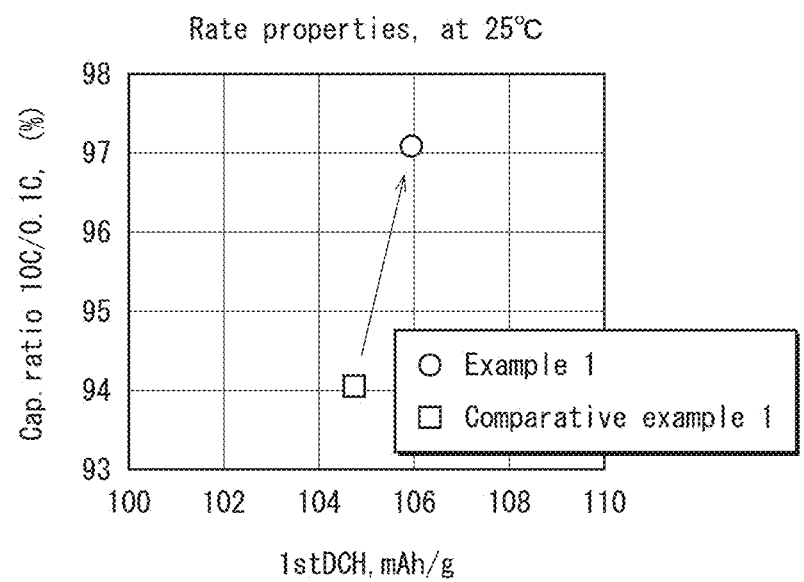
FIG. 8A shows rate properties of non-aqueous electrolyte secondary batteries pertaining to example 1 and comparative example 1.

First, as shown in Table 2, regarding rate properties, Comparative Example 1 and Comparative Example 2 have values of 94.1%, and Comparative Example 3 93.2%, while Examples 1-4 all show higher values. As shown in FIG. 8A, Example 1 shows a value about 3 points higher than Comparative Example 1.

Figure 9:
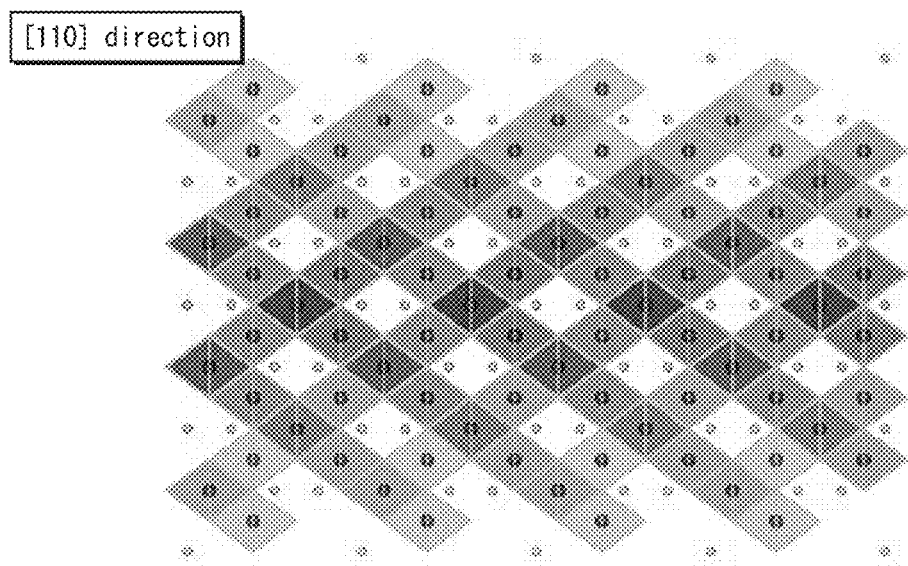
FIG. 9 schematically shows Li diffusion channels in a [110] direction.

This result is considered to show that (110) planes make insertion and desorption of Li to 8a sites easier in charging and discharging, because of a high presence per unit area of diffusion channels of 16c sites where Li is easy to desorb and insert, as shown in the model diagram of FIG. 9.

(Discussion 2)

Next, as shown in Table 2, regarding capacity recovery rates, Comparative example 1 has a value of 94.9%, while Example 1 has a value of 96.9%, Example 2 96.6%, Example 3 97.3%, and Example 4 97.2%, which are higher values. In particular, Example 3, which contains Al in the composition and Example 4, which contains Mg in the composition, have high values over 97%.

Figure 8B:
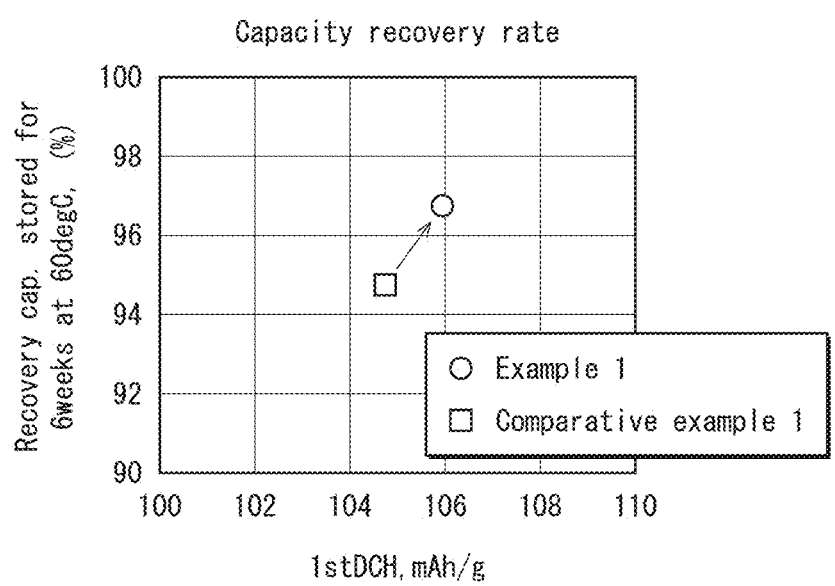
FIG. 8B shows high temperature storage properties.

FIG. 8B shows capacity recovery rates of Example 1 and Comparative example 1. As shown in FIG. 8B, according to presence/absence of W, which is a crystal plane growth suppressor, capacity recovery rates (high temperature storage properties) can increase by approximately two points.

The present results are thought to show that with respect to (111) planes, which are considered to be vulnerable to corrosion by HF in electrolytic solution of Mn, (110) planes remain as particle surfaces due to retarding of crystal plane growth, and therefore the number of (110) planes in contact with electrolytic solution in the lithium manganese oxide particles is increased.

SUMMARY

The positive electrode active material particle powder for a non-aqueous electrolyte secondary battery pertaining to Examples 1-4 is positive electrode active material particle powder comprising: lithium manganese oxide particle powder having Li and Mn as main components and a cubic spinel structure with an Fd-3m space group, wherein the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape having at least one (110) plane that is adjacent to two (111) planes.

[Other Configurations]

In Example 3, Li and Al were used as substituted metal elements, and Li and Mg were used as substituted metal elements in Example 4, but substituted metal elements are not limited to these examples. For example, a portion of Mn may be substituted with one or more cations selected from metal elements capable of substituting at the 16d site, such as Fe, Ni, Zn, Co, Cr, Si, Ti, Sn, V, or Sb.

According to the Embodiment, W is taken as an example of a crystal plane growth suppressor used in manufacturing the positive electrode active material particle powder, but the present invention is not limited to this example. As described above, as long as a substance can suppress crystal growth of (110) planes it can be used.

Further, according to the Embodiment, a coin type of lithium ion secondary battery is used as an example of a non-aqueous electrolyte secondary battery, but the present invention is not limited to this example. For example, the present invention can be applied to cylindrical non-aqueous electrolyte secondary batteries, rectangular non-aqueous electrolyte secondary batteries, and the like. Further, the negative electrode element, the separator, the electrolytic solution, and the like may be changed appropriately.

INDUSTRIAL APPLICABILITY

The present invention is applicable to the realization of non-aqueous electrolyte secondary batteries having excellent rate properties.

REFERENCE SIGNS LIST

1. Positive electrode element
2. Negative electrode element
3. Separator
4. Positive electrode case
5. Negative electrode case
6. Gasket
10. Positive electrode active material particle powder
100. Lithium ion secondary battery

The invention claimed is:

1. Positive electrode active material particle powder for a non-aqueous electrolyte secondary battery, the positive electrode active material particle powder comprising:
    lithium manganese oxide particle powder having Li and Mn as main components and a cubic spinel structure with an Fd-3m space group, wherein
    the lithium manganese oxide particle powder is composed of secondary particles, which are aggregates of primary particles, an average particle diameter (D50) of the secondary particles being from 4 μm to 20 μm, and at least 80% of the primary particles exposed on surfaces of the secondary particles each have a polyhedral shape having at least one (110) plane that is adjacent to two (111) planes.

2. The positive electrode active material particle powder of claim 1, wherein
    one or more metal elements other than Mn are substituted at an Mn(16$d$) site, and when Me denotes a metal element other than Li among the one or more metal elements, an [Li/(Mn +Me)] ratio is from 0.5 to 0.65.

3. A non-aqueous electrolyte secondary battery comprising:
    a positive electrode element that includes the positive electrode active material particle powder of claim 1.

* * * * *